March 25, 1952 A. E. CHURCH 2,590,509
POWER ACTUATED CHUCK
Filed May 14, 1948 2 SHEETS—SHEET 1

INVENTOR
A.E. CHURCH
BY Joseph K. Schofield
ATTORNEY

March 25, 1952  A. E. CHURCH  2,590,509
POWER ACTUATED CHUCK
Filed May 14, 1948  2 SHEETS—SHEET 2
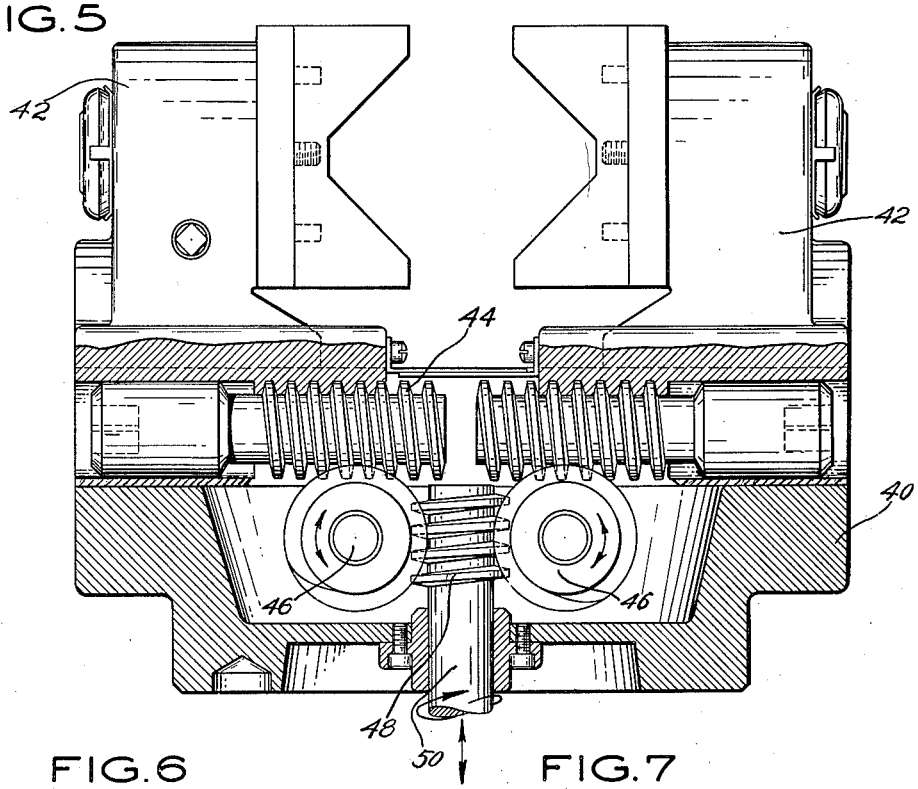
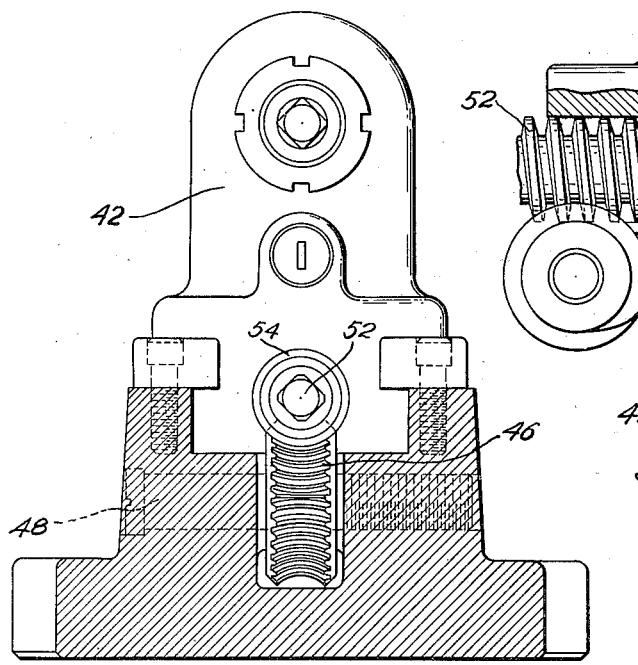
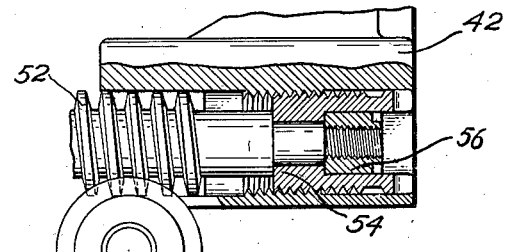
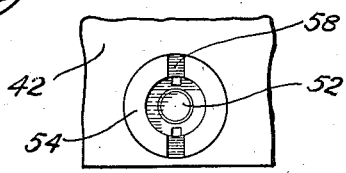
INVENTOR
A. E. CHURCH
BY Joseph K. Schofield
ATTORNEY Patented Mar. 25, 1952

2,590,509

UNITED STATES PATENT OFFICE 2,590,509

POWER ACTUATED CHUCK

Albert E. Church, New Britain, Conn., assignor to Union Manufacturing Company, New Britain, Conn., a corporation of Connecticut Application May 14, 1948, Serial No. 27,117

4 Claims. (Cl. 279—117)

This invention relates to chucks and particularly to a power actuated chuck for supporting work pieces in axial position on rotating spindles of machine tools.

A primary object of the invention is to provide a power operated chuck having radially movable, work engaging jaws that may be actuated by axial movement of a shaft extending longitudinally and centrally within the spindle on which the chuck is mounted or by rotation of a shaft similarly disposed when held against axial movement.

Another object of the invention is to provide intermeshing gear connections between the radially movable jaws and the axially movable actuating member for the jaws.

And finally it is an object of the invention to provide for simultaneous and individual radial adjustment for the jaws relative to their connecting means to the actuating shaft.

With the above and other objects in view the invention may include the features of construction and operation set forth in the following specification and illustrated in the accompanying drawings.

In the accompanying drawings annexed hereto and forming a part of this specification, I have shown the invention embodied in a three jaw and a two jaw work holding chuck but it will be understood that the invention can be otherwise embodied and that the drawings are not to be construed as defining or limiting the scope of the invention, the claims appended to this specification being relied upon for that purpose.

In the drawings:

Fig. 5 is a side elevation partly in section of a modified form of chuck embodying the present invention;

Fig. 6 is another elevation of a chuck similar to that shown in Fig. 5, parts being shown in section to more clearly show the construction;

Fig. 7 is a sectional view showing a modified form of jaw adjusting means, and

Fig. 8 is an end view of the jaw adjusting means shown in Fig. 7.

In the above mentioned drawings there have been shown but two embodiments of the invention which are now deemed preferable, but it is to be understood that changes and modifications may be made within the scope of the appended claims without departing from the spirit of the invention.

Briefly and in its preferred aspect, the invention may include the following principal parts: First, a body member having radially movable work engaging jaws; second, straight line gear or screw threaded members mounted on the rear face of said jaws; third, worm gears engaging the teeth of said gear or rack members on the jaws; fourth, a centrally mounted worm engaging said worm gears; fifth, a rotatable and axially movable shaft supporting said worm, and sixth, means to adjust the radial positions of said jaws simultaneously as a group or independently and individually.

Figure 1:
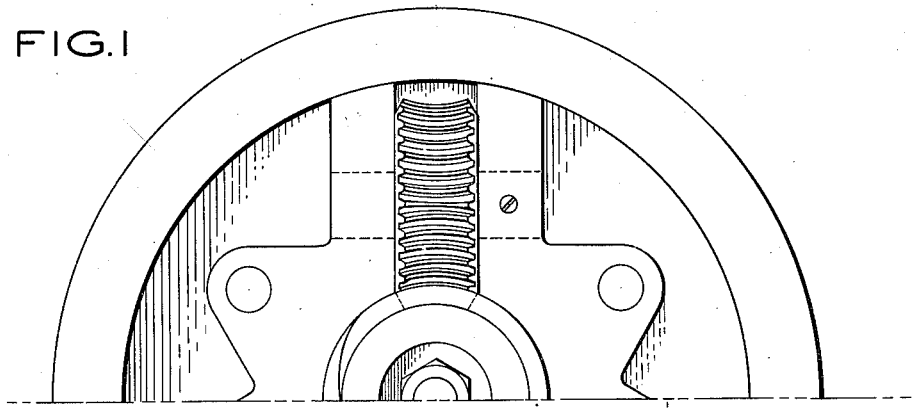
Fig. 1 is a partial front elevation of a chuck made in accordance with the present invention, the view being taken on the plane of line 1—1 in Fig. 2.
Figure 2:
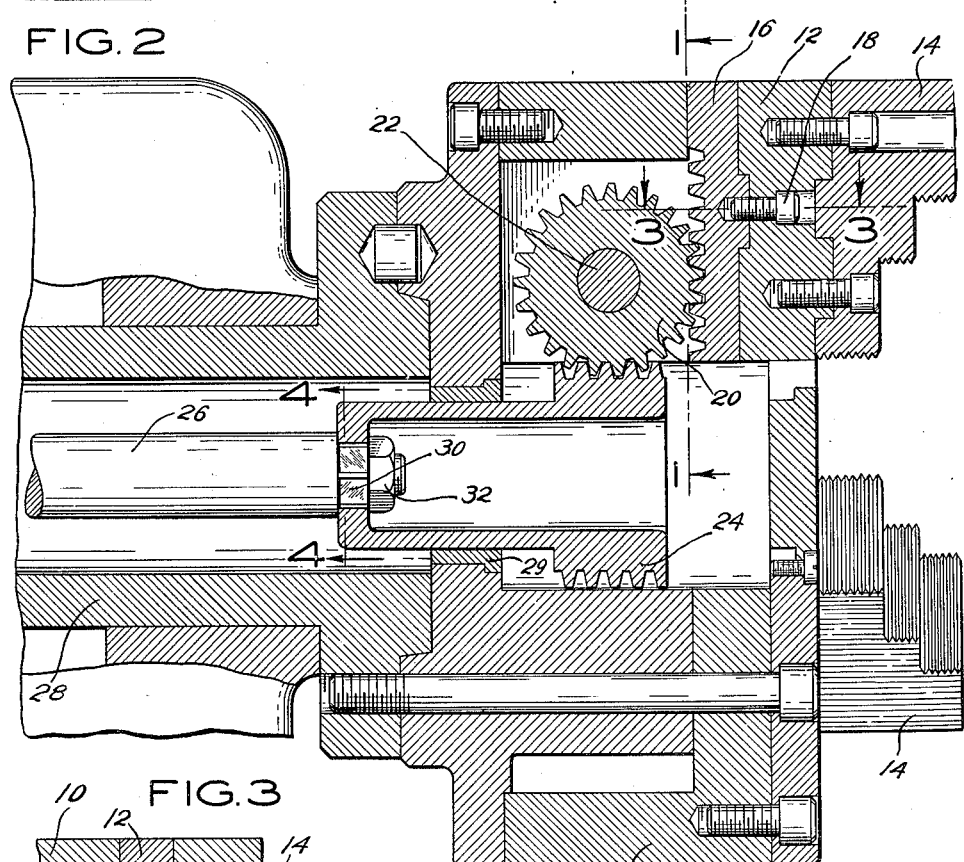
Fig. 2 is a central longitudinal section of the chuck shown in Fig. 1.
Figure 3:
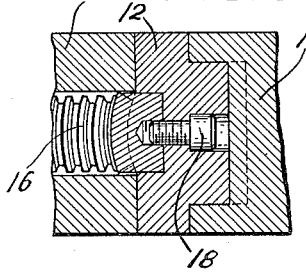
Fig. 3 is a sectional view showing a detail of construction taken on the plane of line 3—3 in Fig. 2.
Figure 4:
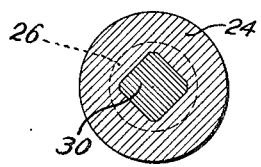
Fig. 4 is a sectional view taken on the plane of line 4—4 in Fig. 2.

Referring more in detail to the figures of the drawings and first to the form of the invention shown in Figs. 1 to 4, it will be seen that a body member 10 is provided with radially movable jaws 12 slidably mounted in its front face. As the body member and jaws may be of any standard form further detail description of them is not thought necessary. It may be stated, however, that the master jaw members 12 may have any type face jaws 14 for gripping internal or external work pieces and on their back faces master jaws 12 may have rack or gear tooth members 16 extending in the direction of movement of the jaws. As shown in Fig. 2, the gear members 16 may be secured to their jaws 12 by one or more screws 18 and have their teeth so formed that they are conjugate to the gear teeth of worm gears 20 with which they are in mesh. The worm gears 20 are mounted within the body member 10 upon individual transversely extending shafts 22. Mounted centrally within the body member 10 is a worm 24 secured on the inner end of a central shaft or rod 26 extending longitudinally through the spindle 28 on which the chuck 10 is mounted. As shown in Fig. 2, rotation or axial movement of the rod or shaft 26 and its worm 24 will simultaneously rotate the worm gears 20 and radially actuate the jaws 12. To support the worm member 24 its outer cylindrical surface may engage a member 29 mounted within the body member 10 through which the member 24 may slide. To connect the shaft 26 to the worm member 24 a square or noncircular and threaded end 30 of the shaft 26 may pass through a closely fitting opening at the inner end of the worm member 24 and be retained in position by means of a nut 32 on the threaded portion of the shaft 26. To actuate the shaft 26 either rotatably or axially appropriate means may be provided at the outer end of the shaft (not shown). By varying the limits of axial or rotative movements of the shaft 26 the limits of opening and closing movements of the jaws 12 for different diameters of work pieces may be simultaneously regulated.

The above described chuck 10 is shown as three jawed and having self or simultaneously centering jaws without individual adjustments. Rotation of the shaft 26 and worm 24 may be used for adjusting the jaws 12 for different diameters of work pieces and axial movement as by pneumatic piston for effecting the opening and closing movements of the jaws to unclamp and clamp work pieces. If desired, however, axial movement of the shaft 26 may be used both for initial adjustment of the chuck for the particular work pieces being operated on and for clamping and unclamping the jaws.

Referring to the form of the invention shown in Figs. 5, 6, 7 and 8 it will be seen that the chuck illustrated has oppositely disposed radially movable jaws 42 slidably mounted in a body member 40 adapted for attachment to a rotatable spindle or fixed table (not shown). Each jaw 42 as shown in Fig. 5 engages by suitably formed threads formed on or fastened to its rear face a portion of the periphery of a screw threaded member 44 also radially movable within the body member 40. Also engaging these screw threaded members 44 are worm gears 46 rotatably mounted on fixed transverse shafts 48 within the body member 40. Disposed between and engaging the worm gears 46 is a worm 48 mounted on or integral with the inner end of a centrally mounted shaft 50. The shaft 50 extends axially within the body member 40 and may be rotated or moved axially by any appropriate means (not shown). Movement of this shaft 50 and its worm 48 either rotatably or axially rotates the worm gears 46 and actuates the jaws 42 radially. The screw threaded members 44 are rotatable within their recesses for radial adjustment relative to the jaws 42 so that the jaws 42 may be adjusted for different diameters of work pieces by rotation of the worm 48 and worm gears 46. By this means the jaws 42 may be initially adjusted for the particular work pieces and the screw threaded members 44 adjusted so that they will not abut when the jaws are moved to clamping position.

To individually adjust the jaws 42 for non-symmetrical work pieces the construction shown in Figs. 7 and 8 may be employed.

The jaws 42 instead of having racks or screw threads on their rear faces intermeshing with a threaded member 44 meshing with the worm 50 have threaded members 52 which are rotatable and slidable within a radial recess formed in the jaw. The outer end of each threaded member 52 is rotatably mounted relative to a sleeve 54 on a reduced diameter portion of the threaded member and held in place by a nut 56 threaded on the outer end of the threaded member 52. The sleeve 54 is rotatable on the reduced end of the threaded member 52 and is threaded to the jaw 42 as shown. Rotation of the sleeve 54 relative to the threaded member 52 and within the jaw 42 radially adjusts the radial position of the jaw 42. To rotate the sleeve 54 slots 58 may be cut in the end face of the sleeve. Rotation or axial movement of the worm 48 and rotation of the worm gears 46 will radially actuate the jaws 42 by the meshing of the worm gears 46 with the threaded members 52. During this operation of opening and closing the jaws 42 the threaded members 52 will be supported against lateral deflection by engagement of their outer diameter with the wall of the recess within which the threaded members are mounted.

I claim as my invention:

1. A work clamping chuck comprising a body member, jaws slidable radially therein, toothed members mounted on and movable with said jaws, worm gears rotatably mounted within said body member and individually meshing with said threaded members, a worm within said body member meshing with each of said worm gears, and a shaft for rotating and axially moving said worm, whereby said jaws may be radially actuated.

2. A work clamping chuck comprising a body member, jaws slidable radially therein, toothed members secured to and moving with said jaws, worm gears rotatably mounted within said body member on fixed axes and individually meshing with said toothed members on said jaws, a worm within said body member meshing with said worm gears, and a shaft carrying said worm extending centrally and axially within said chuck, whereby axial or rotative movement of said shaft will radially actuate said jaws.

3. A work clamping chuck comprising a body member, jaws slidable radially therein, toothed members extending in the direction of movement of said jaws rotatably mounted therein and movable with said jaws, worm gears rotatably mounted within said body member and individually meshing with said threaded members on said jaws, a worm within said body member meshing with said worm gears, and a shaft carrying said worm extending centrally and axially within said chuck, whereby axial or rotative movement of said shaft will radially actuate said jaws.

4. A work clamping chuck comprising a body member, jaws slidable radially therein, toothed members extending in the direction of movement of said jaws and rotatably mounted therein, threaded means to individually adjust the radial position of said jaws relative to their threaded members, worm gears rotatably mounted within said body member and individually meshing with said threaded members on said jaws, a worm within said body member meshing with said worm gears, and a shaft carrying said worm extending centrally and axially within said chuck, whereby axial or rotative movement of said shaft will radially actuate said jaws.

ALBERT E. CHURCH.

REFERENCES CITED

The following references are of record in the file of this patent:

UNITED STATES PATENTS

| Number | Name | Date |
| --- | --- | --- |
| 900,856 | Jecklin et al. | Oct. 13, 1908 |
| 1,089,362 | Hannifin | Mar. 3, 1914 |
| 1,288,051 | Kylin | Dec. 17, 1918 |
| 2,254,588 | Breth | Sept. 2, 1941 |